(12) United States Patent
Charest

(10) Patent No.: US 6,898,825 B1
(45) Date of Patent: May 31, 2005

(54) HOSE CLAMP

(75) Inventor: Scott R. Charest, 880 6TH Ave. NE., Largo, FL (US) 33770

(73) Assignee: Scott R. Charest, Largo, FL (US)

( * ) Notice: Subject to any disclaimer, the term of this patent is extended or adjusted under 35 U.S.C. 154(b) by 73 days.

(21) Appl. No.: 10/642,558

(22) Filed: Aug. 18, 2003

(51) Int. Cl.⁷ .......................... A44B 21/00; B65D 63/00
(52) U.S. Cl. ................... 24/16 PB; 24/17 AP; 24/16 R
(58) Field of Search .......................... 24/16 PB, 17 PB, 24/16 R, 30 R, 17 A, 70 TT; 248/74.1–74.4; 285/282; 70/14–18

(56) References Cited

U.S. PATENT DOCUMENTS

| | | | |
|---|---|---|---|
| 1,965,207 A | * | 7/1934 | Walker ...................... 24/20 TT |
| 2,106,118 A | | 1/1938 | Jacson et al. |
| 4,299,012 A | | 11/1981 | Oetiker |
| 4,306,740 A | * | 12/1981 | Kleykamp et al. ............ 285/39 |
| 4,483,556 A | * | 11/1984 | LiVolsi ....................... 285/252 |
| D317,351 S | | 6/1991 | Takeuchi |
| 5,136,757 A | * | 8/1992 | Labonville .................... 24/271 |
| 5,148,576 A | * | 9/1992 | Dyer .......................... 24/20 R |
| 5,157,815 A | | 10/1992 | Dyer |
| 5,548,876 A | * | 8/1996 | Oetiker ........................ 24/271 |
| 5,664,295 A | | 9/1997 | Kume et al. |
| 6,101,684 A | * | 8/2000 | Ginocchio .................. 24/16 R |
| 6,473,943 B1 | | 11/2002 | Thacker |
| 6,672,116 B1 | * | 1/2004 | Hilliard ......................... 70/16 |
| 6,742,223 B1 | * | 6/2004 | Chang ........................ 24/16 R |

FOREIGN PATENT DOCUMENTS

FR 2613813 * 10/1988

* cited by examiner

Primary Examiner—Robert J. Sandy
Assistant Examiner—Andre' L. Jackson

(57) ABSTRACT

A hose clamp with overlapping ends, with the outer overlapping end having a toothed portion on the outer surface thereof and the overlapping end of the inner overlapping end having a locking arrangement thereon including a pivotable locking member with toothed projections thereon cooperable with the toothed portion on the outer end and the outer end has a graspable projection for tightening the clamp.

5 Claims, 2 Drawing Sheets

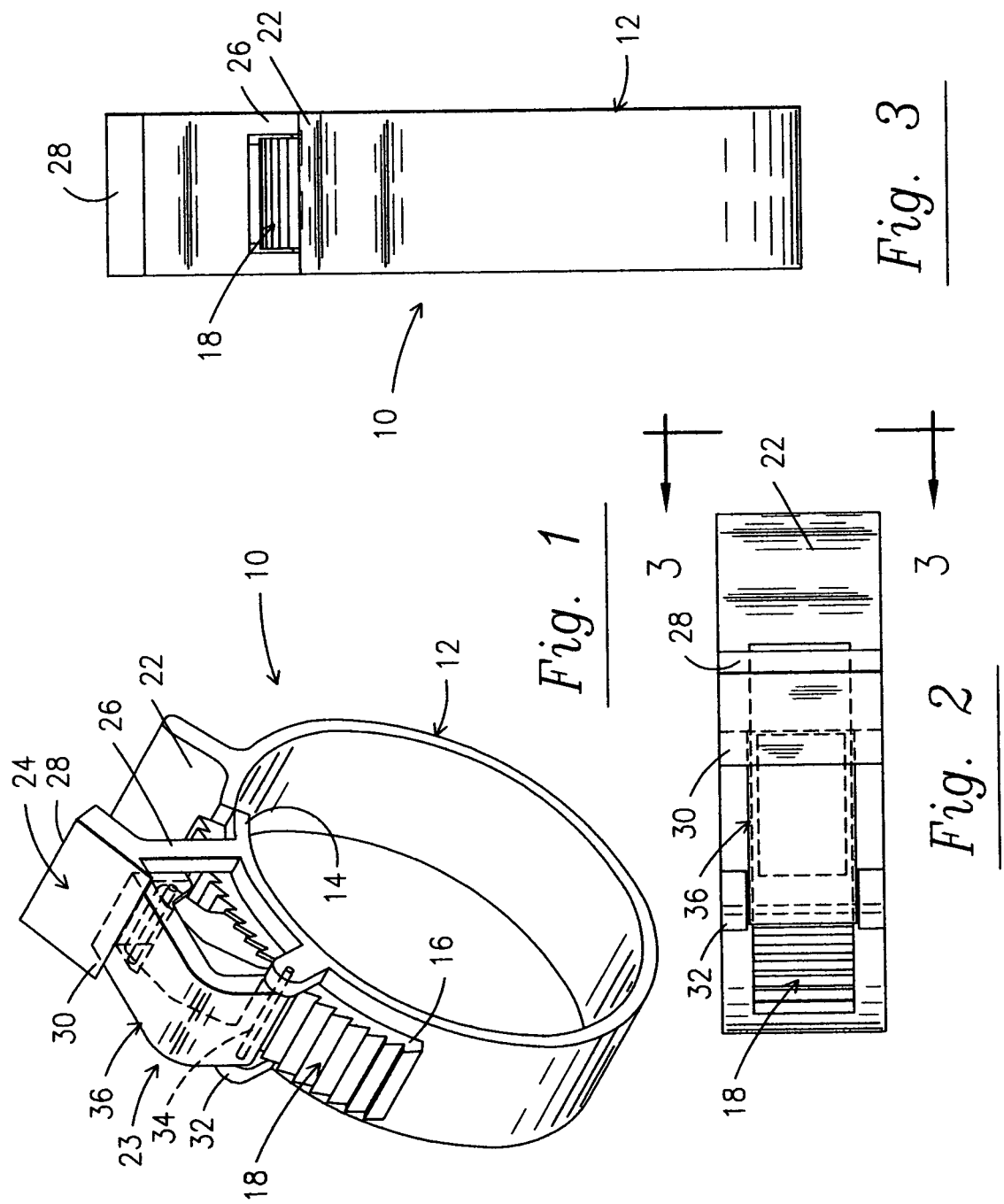

HOSE CLAMP

BACKGROUND OF THE INVENTION

1) Field of the Invention

The present invention relates to hose clamps generally and more specifically to hose clamps which can be installed by a hand operation and the hand operation automatically results tightening of the clamp.

2) Description of the Prior Art

Many prior art patents disclose various hose clamps, however of this variety, it appears from an investigation of the field, that two of these are most prevalent in use. One of these utilizes a screw arrangement for loosening and tightening the clamp as shown and discussed re the prior art in U.S. Pat. No. 5,664,295. This not only necessitates the operator having a screwdriver readily available, but also the very tightening operation is difficult, for not only must the clamp be in a position where the screw is available to the operator for tightening, but the operator must hold the clamp with one hand to keep it from rotating away, while tightening the screw with the screwdriver in the other hand which frequently results in an injury when the screwdriver slips. Another prior art device utilizes a spring clamp which is, as a result of its material or configuration, normally biased to its tightly closed position. To open the spring clamp, the operator must manipulate a pair of tangs, as shown in the above mentioned patent, which is again a difficult operation as the tangs must overcome a spring tension load.

SUMMARY OF THE INVENTION

The present invention contemplates a hose clamp including a circular member with overlapping ends. The outer end of the circular member, which lies over the overlapping inner end of the circular member, has a plurality of parallel toothed projections projecting from the upper surface thereof adjacent the end thereof, with the projections lying at right angles to the circumference of the clamp. The end of the overlapping inner end of the circular member which lies under the outer end, has secured thereto a support member which extends radially outwardly from the outer surface of the overlapping inner end and passes around and projects above the outer end. An abutting member is fixedly secured to support member adjacent the end of the overlapping inner member and a securing member is pivotly secured to the support member at a short distance from the abutting member, with the securing member having an abutting end being movable into abutting engagement with the abutting member. A locking member is pivotally secured to the securing member adjacent its abutting end, and has a toothed surface thereon engageable with the toothed projections on the upper surface of the inner end. The outer end has a graspable outwardly extending projection thereon spaced from the toothed projections thereon, which graspable projection may be pressed upon to tighten the clamp, and the abutting member is flexible enough to resiliently engage and secure the securing member in the locked position and being flexed to release the securing member.

BRIEF DESCRIPTION OF THE DRAWINGS

FIG. 1 is a perspective view of the hose clamp of this invention;

FIG. 2 is a plan view of the clamp shown in FIG. 1;

FIG. 3 is a left side elevational view;

DETAILED DESCRIPTION OF THE PREFERRED EMBODIMENT

Figure 4:
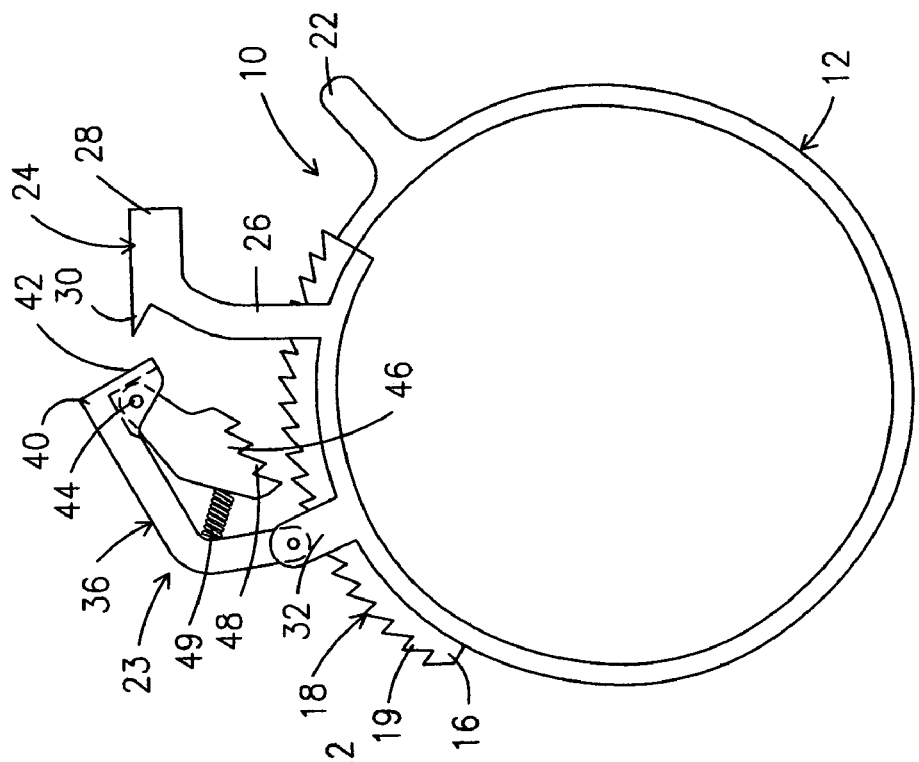
FIG. 4 is a front elevational view with the hose clamp in the locked position.

Referring now to the drawings, a hose clamp is shown generally at 10 and includes an annular member 12 having overlapping end portions, namely an overlapping inner end 14 and an overlapping outer end 16. The overlapping outer end 16 has approximately 25% of its periphery, starting from the very end thereof, provided with a series of toothed projections 18 thereon, with the width of the toothed portion 18 of the overlapping outer end 16 being reduced from the width of the remainder of the annular member 12. As seen, each tooth 19 of the toothed projections 18 has its clockwise face 20 disposed radially with respect to the center of the annular member 12, while its other face 21 is disposed in a chordal direction. Spaced slightly clockwise from the tooth projections 18, a radially projecting graspable member 22 projects outwardly from the outer surface of the annular member 12.

Figure 5:
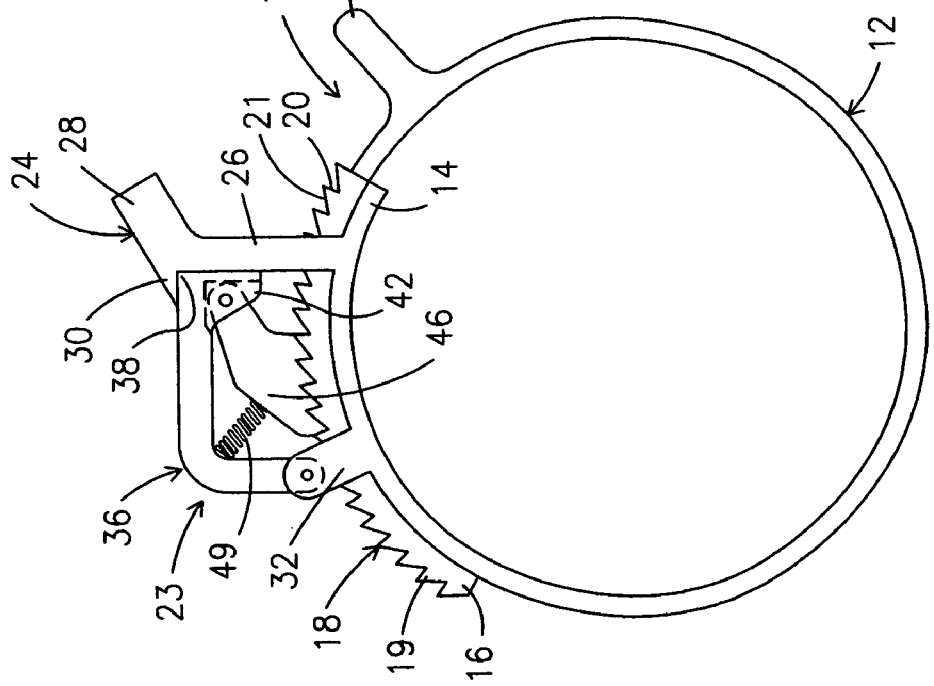
FIG. 5 is a view like FIG. 4 with the clamp in the unlocked condition.

The overlapping inner end 14 of the of the annular member 12 lies under the outer end 16, and adjoining its very end has a locking arrangement 23 for cooperating with the toothed projections 18 including an abutting member 24 projecting outwardly therefrom, which abutting member includes a pair of laterally spaced apart legs 26, with one leg of said pair of legs joined to the outer surface of the end 14 on each side of the toothed portion 18. The pair of legs 26 of the abutting member 24 are connected at their outer end by a connecting portion 28 which has a latching lip 30 extending to the left therefrom as seen in the drawings. Spaced counter clockwise from the legs 26 are a pair of laterally spaced apart pivot members 32, with one pivot member of said pair of members joined to the outer surface of the end 14 on each side of the toothed portion 18 and projecting outwardly therefrom to slightly overly the periphery of the toothed portion 18. Pivotly secured to the pivot members 32 by a pivot pin 34 is an "L" shaped securing member 36, which has an unlocked position as seen in FIG. 5, and a locked position as seen in FIGS. 1 and 4. In the unlocked position, it is pivoted counterclockwise from its locked position, while in its locked position, it is pivoted clockwise into abutting engagement with the abutting member 24 and secured in the abutting relationship by the lip 30 overlying the outer corner 38 at the abutting right end 40 thereof. A pair of laterally spaced projections 42 extend downwardly from the right abutting end 40 of the securing member 36, and pivotally secured thereto by a pivot pin 44 is a locking member 46 having toothed projections 48 thereon on the lower end thereof, with the toothed projections 48 being a formed to fittingly cooperate with the toothed projections 18. A compression spring 49 is compressed between the top of the locking member 46 and the inner surface of the securing member 36.

As seen in FIG. 4, with the clamp in its locked position, the member 46 will be pivoted so that its toothed projections 48 will be engaged with the toothed projections 18 and the abutting member is locking it in place. In this relationship, an operator can squeeze the projection 22 and the securing portion 36 to move the projecting portion 22 toward the connecting portion 28 to resiliently ratchet the clamp 12 to a tighter relationship. To release the clamp 12, the operator can press downwardly and to the right on the connecting portion 28 to flex the legs 26 (in FIG. 5, the legs 26 being shown in their flexed condition for illustration purposes, since normally they are straight as seen in FIG. 4) to release the lip 30 from the securing member 36 and lift the securing member such that the toothed projections 48 of the locking member are disengaged from the from the toothed projections 18, at which time the diameter of the clamp can be increased to release it from the hose.

While only a preferred embodiment of this invention has been shown and described, it is apparent that changes can be made therein without departing from the scope of this invention as claimed in the following claims.

What is claimed is:

1. An annular hose clamp with a pair of overlapping ends, one of said ends being an inner end and the other of said ends being an outer end, said ends overlapping for approximately 25% of the circumference of said clamp with each of said ends having an overlapping portion, comprising
   a) said outer end having a plurality of toothed indentations on the outer surface of the overlapping portion thereof forming a toothed portion and having a graspable projection extending outwardly therefrom adjacent to said toothed portion,
      1) said toothed portion having a width which is reduced relative to the width of the remainder of said clamp,
   b) said inner end having a locking arrangement thereon overlying at least a portion of said toothed portion with said locking arrangement including
      1) an abutting member fixedly carried by said inner end and having a lip portion thereon,
      2) a securing member with means pivotally attaching said securing member to said inner end,
      3) and a locking member including means pivotally connecting said locking member to said securing member and resilient means biasing said locking member relative to said securing member and with said locking member including toothed projections thereon cooperable with said toothed portion on said outer end,
   c) said securing member having a first position wherein it abuts said abutting member and said lip portion on said abutting means secures the abutting relationship, and second position wherein it is spaced from said abutting member, in said first position said toothed projections on said locking member resiliently engages said toothed portion on said outer end,
   d) said graspable portion being movable toward said abutting member to reduce the circumference of said hose clamp and said abutting member being movable to move said lipped portion from said securing member to release said hose clamp.

2. A hose clamp according to claim 1 wherein said abutting member includes a pair of spaced legs secured to said inner end and receiving therebetween said toothed portion on said outer end.

3. A hose clamp according to claim 1 wherein said means pivotably attaching said securing member to said inner end includes a pair of pivot members secured to said inner end and receiving therebetween said toothed portion on said outer end, and a pivot pin connecting said securing member to said pivot members.

4. A hose clamp according to claim 3 wherein said abutting member includes a pair of spaced legs secured to said inner end and receiving therebetween said toothed portion on said outer end.

5. A hose clamp according to claim 4 wherein said spaced legs are secured to said inner end adjacent the end thereof and said pivot members are spaced from said legs.

\* \* \* \* \*